United States Patent
Schlotmann et al.

[15] 3,635,049
[45] Jan. 18, 1972

[54] RESILIENT SHAFT COUPLING

[72] Inventors: Karl Schlotmann, Jaegerweg 13; Heinz-Dieter Bohm, Peukinger Weg 18, both of 475 Unna; Werner Ruggen, Lessingstrasse 7, 4757 Holzwickede, all of Germany

[22] Filed: Apr. 8, 1970

[21] Appl. No.: 31,044

[30] Foreign Application Priority Data

Apr. 4, 1969 Germany............P 19 18 621.1

[52] U.S. Cl. ..................................64/11 R, 64/14
[51] Int. Cl............................................F16d 3/18
[58] Field of Search.................................64/9, 11, 14

[56] References Cited

UNITED STATES PATENTS

| 2,867,102 | 1/1959 | Williams | 64/11 |
|---|---|---|---|
| 3,137,149 | 6/1964 | Schlotmann | 64/11 |
| 2,952,143 | 9/1960 | Case | 64/11 |
| 3,313,124 | 4/1967 | Filepp | 64/11 |

*Primary Examiner*—Kenneth W. Sprague
*Attorney*—Erwin Salzer

[57] ABSTRACT

A resilient shaft coupling wherein a pair of hub members is tied together for torque transmission by a flexible coupling member U-shaped in cross section and having generally the configuration of an automotive tire. Each hub member is provided with a torque-transmitting gear in mating engagement with a cooperating torque-transmitting gear on each of a pair of flange portions of the coupling member. The coupling is further provided with additional means for precluding disengagement of the mating torque-transmitting gears, and any undesired relative movement thereof. For these reasons the coupling allows transmission of relatively larger blocks of power than possible with comparable prior art resilient couplings, and transmission of blocks of power at higher numbers of revolution per unit of time than possible with comparable prior art resilient couplings.

10 Claims, 4 Drawing Figures

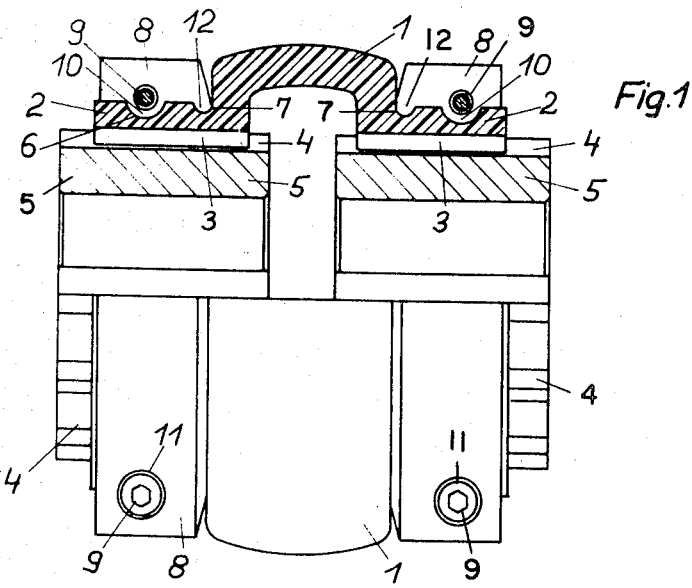
Fig. 1
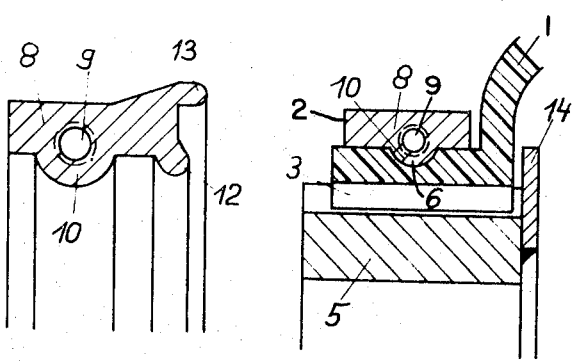
Fig. 2          Fig. 3
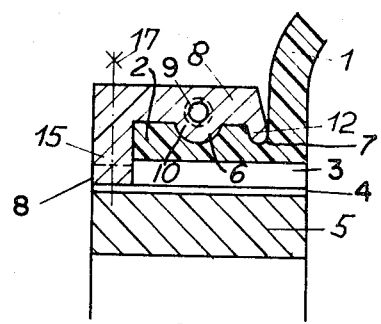
Fig. 4
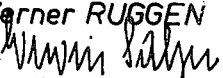

RESILIENT SHAFT COUPLING

BACKGROUND OF INVENTION

Prior art couplings of the aforementioned description are subject to a tendency of partial separation of their cooperating torque-transmitting gears. This limitation becomes more apparent when it is desired to transmit a relatively large torque from one shaft to another coaxially arranged shaft, or when both shafts to be coupled for joint motion are subjected to large angular velocities resulting in large centrifugal forces.

The principal object of the present invention is to provide resilient shaft couplings which are not subject to the aforementioned limitations, or drawbacks, and more particularly to provide resilient shaft couplings having entirely conforming mating torque-transmitting parts whose shape and position are not significantly changed under the action of external forces, including centrifugal forces, and thus retain their perfect mating engagement under various and the most onerous operating conditions. The means provided by the invention to achieve the above ends do not call for exertion of excessive pressures on the resilient parts of couplings, and more particularly on the resilient coupling member thereof which is generally made of natural or a synthetic rubber, and should not be subjected to excessive pressures.

Another object of the invention is to provide flexible shaft couplings which have the above desirable performance characteristics, and which lend themselves to be assembled in a particularly simple fashion, thus minimizing the cost of installation and maintenance.

Still another object of the invention is to provide improved resilient shaft couplings including a resilient or flexible coupling member having flanges with torque-transmitting gears which flanges are supported at a plurality of spaced critical points against the action of centrifugal forces.

SUMMARY OF INVENTION

Resilient or flexible couplings embodying this invention include a pair of aligned shaft-receiving hub members each having a torque-transmitting gear on the radially outer side thereof. Such couplings further include a resilient annular coupling member surrounding said pair of hub members. The coupling member has a pair of axially outwardly projecting flanges each overlapping one of said pair of hub members. Each of said pair of flanges has a torque-transmitting gear on the radially inner side thereof in mating engagement with said torque-transmitting gear on the radially outer side of each of said pair of hub members. The coupling further includes a pair of annular clamping means each mounted on the radially outer side of one of said pair of flanges of said coupling member.

The essence of the present invention consists in the arrangement of screw studs for securing the aforementioned annular clamping means to the coupling in such a way that they project through said pair of flanges of said coupling member at regions of said pair of flanges where the latter are reinforced by toroidally shaped keys or tongues engaging corresponding toroidally shaped recesses in said pair of flanges.

BRIEF DESCRIPTION OF DRAWINGS

FIG. 1 illustrates a coupling embodying the present invention, the upper part of FIG. 1 showing the coupling in longitudinal cross section, and the lower part of FIG. 1 showing the coupling in elevation or front view;

FIG. 2 shows partly in side elevation and partly in vertical section a modification of one of the annular clamping means of the coupling according to FIG. 1; and FIGS. 3-4 each show in vertical section another modification of the structure of FIG. 1, each figure being limited to the left portion of the coupling, the right portion thereof being of the same nature as its left portion.

DESCRIPTION OF PREFERRED EMBODIMENTS OF THE INVENTION

Referring now to the drawings, and more particularly to FIG. 1 thereof, reference character 1 has been applied to indicate a resilient annular coupling member of rubber or the like elastomer which has substantially the shape of an automotive tire, i.e. it is substantially U-shaped in cross section. Coupling member 1 and a pair of axially outwardly projecting flanges 2 thereof may be made either of natural or synthetic rubber, and they may include one or more reinforcement inserts of a textile material (not shown). Each flange 2 of coupling member 1 is provided with a torque-transmitting gear 3 including a plurality of straight gear teeth which are arranged in a cylindrical pattern around the axis of the coupling.

The coupling further includes a pair of coaxial, spaced hub members 5 of which each is substantially in the shape of a hollow cylinder and intended to be mounted on a pair of shafts (not shown) to be coupled. Each of hub members 5 has a torque-transmitting gear 4 on the radially outer surface thereof. The teeth of gear 4 are straight and form a cylindrical pattern around the axis of the coupling. Gears 3 and 4 are in engagement so that torques can be transmitted from one hub member 4 to the other hub member 4 by the intermediary of coupling member 1 and the flanges 2 thereof overlapping hub members 5. The preferred configuration of the teeth constituting gear 4 is also more fully disclosed in our aforementioned copending patent application to which reference may be had in regard to the preferred configuration of the teeth of gears 3 and 4.

It will be apparent from FIG. 1 that the axial length of the teeth of gears 4 exceeds the axial length of the teeth of gears 3, and that gears 3 are arranged in such a way relative to gears 4 that the teeth of gears 4 project on both sides beyond the end surfaces of the teeth of gears 3.

Such a coupling requires further for the provision of means for maintaining gears 3, 4 in torque-transmitting engagement mainly against the action of centrifugal forces. To this end the coupling includes a pair of annular clamping means 8 each mounted on the radially outer side of one of the pair of flanges 2 of coupling member 1. These annular clamping means 8 may be tightened by conventional fastener means as shown more in detail in our above-referred-to copending patent application. Each of the annular clamping means 8 of FIG. 1 is formed by a pair of complementary semicircular elements tied together at the junctions thereof by screw-threaded studs 9 arranged in a plane at right angles to the common axis of coupling member 1 and hub members 5. Reference characters 11 have been applied to indicate recesses in annular clamping means 8 for receiving the heads of the clamping screws 9 for annular clamping means 8.

The radially outer surfaces of flanges 2 of coupling member 1 are provided with recess means 6 and projections 10 solid with annular clamping means 8 enter into recess means 6 to maintain firm engagement between torque-transmitting gears 3 and 4. In the particular embodiment of the invention shown in FIG. 1 each of recess means 6 is formed by a toroidally shaped groove in the outer surface of each flange 2, and each of the aforementioned projections 10 is formed by a toroidally shaped tongue being a part of each flange 2 and projecting into the aforementioned groove. Clamping screws 9 project through toroidally shaped tongues 10, i.e., the shafts of screws 9 are surrounded at a portion of the length thereof by the material of which the toroidally shaped tongues 10 of annular clamping means 8 are made. This greatly increases the mechanical strength or dimensional stability of the clamping structure of flanges 2. The presence of mating parts 6, 10 greatly reduces the danger of separation of flanges 2 and gears 3 from gears 4 of hub members 5 at the particular point where parts 6, 10 are located.

It will be apparent that the more screws 9 are tightened, the higher the pressure which is exerted radially inwardly by annular clamping means 8. Screw-threaded studs 9 may be arranged relatively close to the longitudinal axis of the coupling. In the structure shown the largest radius of the coupling is the outer radius of the center portion of coupling member 1, and the spacing of screw-threaded studs 9 from the axis of the coupling is less than the first-mentioned radius. As a result, the bulk of the coupling tends to be small, and the ends of screw-threaded studs 9 do not project radially outwardly beyond the general outline of the coupling, thus avoiding the danger of injury to operating personnel by outwardly projecting parts of the coupling.

As shown in FIG. 1 each of the pair of flanges 2 is provided with a pair of toroidally shaped grooves 6 and 7, and each annular clamping means 8 is provided with a pair of toroidally shaped tongues 10 and 12. Tongues 10 project into grooves 6 and tongues 12 project into grooves 7. The median planes of grooves 6 and 7 of each flange 2 enclose an acute angle, and the median planes of tongues 10 and 12 of each annular clamping means 8 enclose the same acute angle as the median planes of grooves 6 and 7. Grooves 7 and tongues 12 tend to preclude a disengagement of gears 3 and 4 in the region where flanges 2 project at substantially right angles from the center portion of coupling member 1. At this point the centrifugal forces to which coupling member 1 is subjected are particularly large. Hence the provision of means precluding separation of gears 3 and 4 is particularly important at the points of junction of flanges 2 with the center portion of coupling member 1.

Coupling member 1 may have a radial slit as explained more in detail in our copending patent application to which reference is made above. In the particular structure shown in FIG. 1 the coupling member 1 and its flange 2 do not require a radial slit for mounting the same on hub members 5. Coupling member 1 and its flanges 2 may be mounted on hub members 5 merely by sliding the former on the latter in the direction of the common axis thereof. The omission of a mounting slit in coupling member 1 and its flanges 2 is desirable wherever the torque to be transmitted by the coupling is relatively large, or the number of revolution per minute to which the coupling will be subjected is relatively high.

FIG. 2 shows a modification of the annular clamping means 8 of FIG. 1 and this modification is intended to be combined with a pair of shaft-receiving hub members and with a flanged coupling member in the way shown in FIG. 1. The structure of FIG. 2 includes in addition to the toroidally shaped tongue 10 which is arranged approximately midway between the axially outer end and the axially inner end of annular clamping means 8, and in addition to the toroidally shaped tongue 12—both of which are substantially the same as the toroidally shaped tongues 10, 12 of FIG. 1—a third toroidally shaped tongue 13. The median plane of toroidally shaped tongue 13 is substantially coaxial with hub members 5 of FIG. 1 and adapted to engage the radially outwardly extending center portion of coupling member 1. To this end the point of the center portion of coupling member 1 juxtaposed to tongue 13 ought to be provided with a toroidally shaped groove (not shown) conforming to the shape of toroidally shaped projection or key 13. Toroidally shaped projection or key 13 forms a support for the center portion of coupling member 1 in an area where it is subjected to particularly high centrifugal forces. The provision of projection or key 13 makes it possible to operate the coupling at relatively large numbers of revolutions per minute, all other circumstances remaining unchanged.

The coupling of FIG. 3 is similar to that of FIG. 1, but differs from that of FIG. 1 inasmuch as the former dispenses with toroidally shaped groove 7 at the junction of the center portion of coupling member 1 and the flange 2 of coupling member 1 and of a toroidally shaped key or projection 12 mating with groove 7. The structure of FIG. 3 differs further from that of FIG. 1 by the addition in the former of disk-shaped abutment 14 on the axially inner end surface of each hub member 5, limiting axial movement of each of the pair of flanges 2 of coupling member 1 relative to the pair of hub members 5. The structure of FIG. 3 is desirable on account of its great simplicity, but it is only suited for relatively nononerous operating conditions. The presence of abutment disks 14 which may be welded to hub members 5 preclude mounting of the coupling member 1 with its flanges 2 by an axial movement thereof relative to hub members 5. In the structure of FIG. 3 the coupling member 1 and its flanges 2 must be formed by two separate complementary parts, or it must at least be provided with a radial slit to make it possible to mount it on hub members 5. This tends to decrease the mechanical strength of the structure, but its great simplicity still makes it desirable in instances where mechanical strength is not of prime importance.

The structure of FIG. 4 includes two toroidally shaped projections or keys 10, 12 integral with the annular clamping means 8 and two toroidally shaped grooves 6, 7 formed by coupling member 1 and its flanges 2. The annular clamping means 8 have a radially inwardly extending projection 15, the radially inner end of which forms a gear whose constituent teeth have axially inner end surfaces which are juxtaposed to the axially outer end surfaces of the teeth forming gear 3. To achieve this end the radially inner portion of projection 15 has a system of gear teeth 18 which is virtually congruent with the system of gear teeth 4 formed by hub member 5. This makes it possible to arrange during assembly of the coupling each of the teeth of gear system 18 in registry with the teeth of gear system 4, and each of the spaces between the teeth of gear system 18 in registry with the spaces between the teeth of gear system 4. In this position the unit formed by coupling member 1 and its flanges 3 and annular clamping means 8 may be mounted on hub members 5 by a movement of parts 1, 2 and 8 relative to parts 5 in a direction of the axis of the coupling. When this has been achieved, annular clamping means 8 may be rotated about the axis of the coupling so as to move the axially inner end surfaces of the system of teeth 18 to a position in which they are juxtaposed to the axially outer end surfaces of the constituent teeth of the gear 3. This precludes any undesired axial relative movement of gears 3 and 18. When gear 18 has been moved to the abutment position thereof it must be retained in that position by appropriate fastener means or, in other words, any rotary motion thereof which might move it out of its abutment position must be precluded. In FIG. 6 reference numeral 17 has been applied to a dotted line indicating diagrammatically such a fastener means projecting radially through projection 15 of annular clamping means 8 into hub member 5. Fastener means 17 may, for instance, be a setscrew. If desired the axially outer end of each hub member 5 may be provided with an annular groove (not shown) into which the radially inner end of projection 15 extends. Such an arrangement facilitates the rotary motion of parts 8, 15, 18 from their position of registry to the abutment position or locking position thereof.

It will be apparent from the above that the rotation feature of the structure of FIG. 6 is in effect that of a bayonet-type fastener.

It will be apparent from the above and in particular from the drawings that in all the preferred embodiments of the invention the toroidal keys or tongues 10 are substantially semicircular in cross section and that the straight axes of studs 9 extend tangentially to the circular axes of keys or tongues 10.

It will be further apparent from the above that the projections 12 of the structures of FIGS. 1, 2 and 4 are substantially claw shaped and operate in the fashion of claws or talons projecting into coupling member 1 and its flange 2. The relative positions of keys 10 and claws 12 is crucial as far as the performance characteristics of the coupling are concerned. To be more specific, tongues or keys 10 ought to be positioned approximately midway between the axially outer ends and the axially inner ends of clamping means of clamping rings 8, and claws or talons 12 ought to be arranged closer to the median plane of coupling member 1 than parts 10.

The setscrew 17 or the like of FIG. 4 is a releasable fastener means which selectively allows and precludes rotary motions of clamping means or clamping rings 8 relative to hub members 5.

Referring to FIG. 2, the relative positions of projections 10, 12 and 13 is of considerable importance. Projection 13 and the point where it engages coupling member 1 are more remote from the axis of coupling member 1 than tongue 10 and projection 12 and the points where parts 10 and 12, respectively, engage coupling member 1.

All of the embodiments of the invention shown have the common feature, though in varying degrees, of allowing coupling of relatively large blocks of power and are suitable for transmission of large torques. These couplings may be applied in instances where prior art resilient shaft couplings including systems of cooperating torque-transmitting gears cannot be applied.

We claim as our invention:

1. A resilient shaft coupling including a pair of aligned shaft-receiving hub members each having a torque-transmitting gear on the radially outer side thereof, a resilient annular coupling member surrounding said pair of hub members and having a pair of axially outwardly projecting flanges each overlapping one of said pair of hub members and each having a torque-transmitting gear on the radially inner side thereof in mating engagement with said torque-transmitting gear on the radially outer side of said pair of hub members, each of said pair of flanges of said coupling member being provided at the radially outer side thereof with a toroidally shaped groovelike recess, a pair of annular radially subdivided clamping means each mounted upon said radially outer side of one of said pair of flanges of said coupling member, each of said pair of clamping means having a toroidally shaped tongue engaging said toroidally shaped groovelike recess in one of said pair of flanges of said coupling member; and screw studs for tightening said pair of clamping means arranged in planes defined by said toroidal groovelike recess and by said toroidally shaped tongue, said screw studs extending through said pair of flanges of said coupling member at points where each of said pair of flanges is reinforced by said toroidally shaped tongue thereof.

2. A resilient shaft coupling as specified in claim 1 wherein said toroidally shaped tongue is arranged approximately midway between the axially outer end and the axially inner end of each of said pair of annular clamping means, and wherein each of said pair of annular clamping means is provided with a projection in addition to toroidally shaped tongue engaging said coupling member and arranged closer to the median plane of said coupling member than said toroidally shaped tongue.

3. A resilient shaft coupling including a pair of aligned shaft-receiving hub members each having a torque-transmitting gear on the radially outer side thereof, a resilient annular coupling member surrounding said pair of hub members and having a pair of axially outwardly projecting flanges each overlapping one of said pair of hub members and each having a torque-transmitting gear on the radially inner side thereof in mating engagement with said torque-transmitting gear on the radially outer side of said pair of hub members, and a pair of annular clamping means each mounted on the radially outer side of said pair of flanges of said coupling member wherein each of said pair of flanges of said coupling member is provided with a pair of coaxial toroidal grooves on the radially outer surface thereof, wherein each of said pair of annular clamping means is provided with a pair of toroidal tongues projecting into said pair of toroidal grooves in one of said pair of flanges of said coupling member, wherein the median planes of said pair of toroidal grooves of each of said pair of flanges of said coupling member enclose a first acute angle, and wherein the median planes of said pair of toroidal tongues of each of said pair of annular clamping means enclose a second acute angle equal to said first acute angle.

4. A resilient shaft coupling including a pair of aligned shaft-receiving hub members each having a torque-transmitting gear on the radially outer side thereof, a resilient annular coupling member surrounding said pair of hub members and having a pair of axially outwardly projecting flanges each overlapping one of said pair of hub members and each having a torque-transmitting gear on the radially inner side thereof in mating engagement with said torque-transmitting gear on the radially outer side of said pair of hub members, each of said pair of flanges of said coupling member being provided on the radially outer side thereof with a toroidal groove and a pair of annular clamping means each mounted on the radially outer side of said pair of flanges of said coupling member, each provided with a toroidal tongue projecting into said toroidal groove in one of said pair of flanges of said coupling member wherein said toroidal groove is arranged substantially at the point where each of said pair of flanges projects from said coupling member, and wherein said toroidal tongue is arranged immediately adjacent to the axially inner end of each of said pair of annular clamping means.

5. A resilient shaft coupling as specified in claim 3 wherein each of said pair of annular clamping means is provided with an additional toroidally shaped tongue having a median plane substantially coaxial with said pair of hub members adapted to engage a radially outwardly extending portion of said coupling member.

6. A resilient shaft coupling including a pair of aligned shaft-receiving hub members each having a torque-transmitting gear on the radially outer side thereof, a resilient annular coupling member surrounding said pair of hub members and having a pair of axially outwardly projecting flanges each overlapping one of said pair of hub members and each having a torque-transmitting gear on the radially inner side thereof in mating engagement with said torque-transmitting gear on the radially outer side of said pair of hub members, each of said pair of flanges being provided with recess means on the radially outer surface thereof, and a pair of annular clamping means each mounted on the radially outer side of said pair of flanges of said coupling member, and each including a projection engaging said recess means to maintain a firm engagement between said pair of flanges and said pair of hub members, each of said pair of annular clamping means being further provided adjacent the axially outer end thereof with a radially inwardly extending projection engaging the axially outer end surfaces of said torque-transmitting gear of one of said pair of flanges of said coupling member and fastener means extending radially through each of said pair of annular clamping means and having a radially inner end engaging one of said pair of hub members to preclude rotation of each of said pair of annular clamping means relative to one of said pair of hub members.

7. A resilient shaft coupling as specified in claim 2 wherein said projection is in the shape of a claw penetrating into said coupling member.

8. A resilient shaft coupling as specified in claim 7 wherein each of said pair of clamping means further includes a projection engaging the surface of said coupling member at a point more remote from the axis of said coupling member than said toroidally shaped tongue and more remote from the axis of said coupling member than said projection in the shape of a claw.

9. A resilient shaft coupling as specified in claim 1 wherein each of said pair of clamping means is provided with a system of gears having end surfaces in registry with the end surface of said torque-transmitting gear on one of said pair of hub members, and wherein each of said pair of clamping means is provided with a releasable fastener means for selectively allowing and precluding rotary motions of said pair of clamping means relative to said pair of hub members.

10. A resilient shaft coupling as specified in claim 1 wherein said toroidally shaped tongue of each of said pair of clamping means is substantially semicircular in cross section, and wherein the axis of each of said screw studs engages tangentially the axis of said toroidally shaped tongue of one of said clamping means.

* * * * *